Patented Dec. 17, 1929

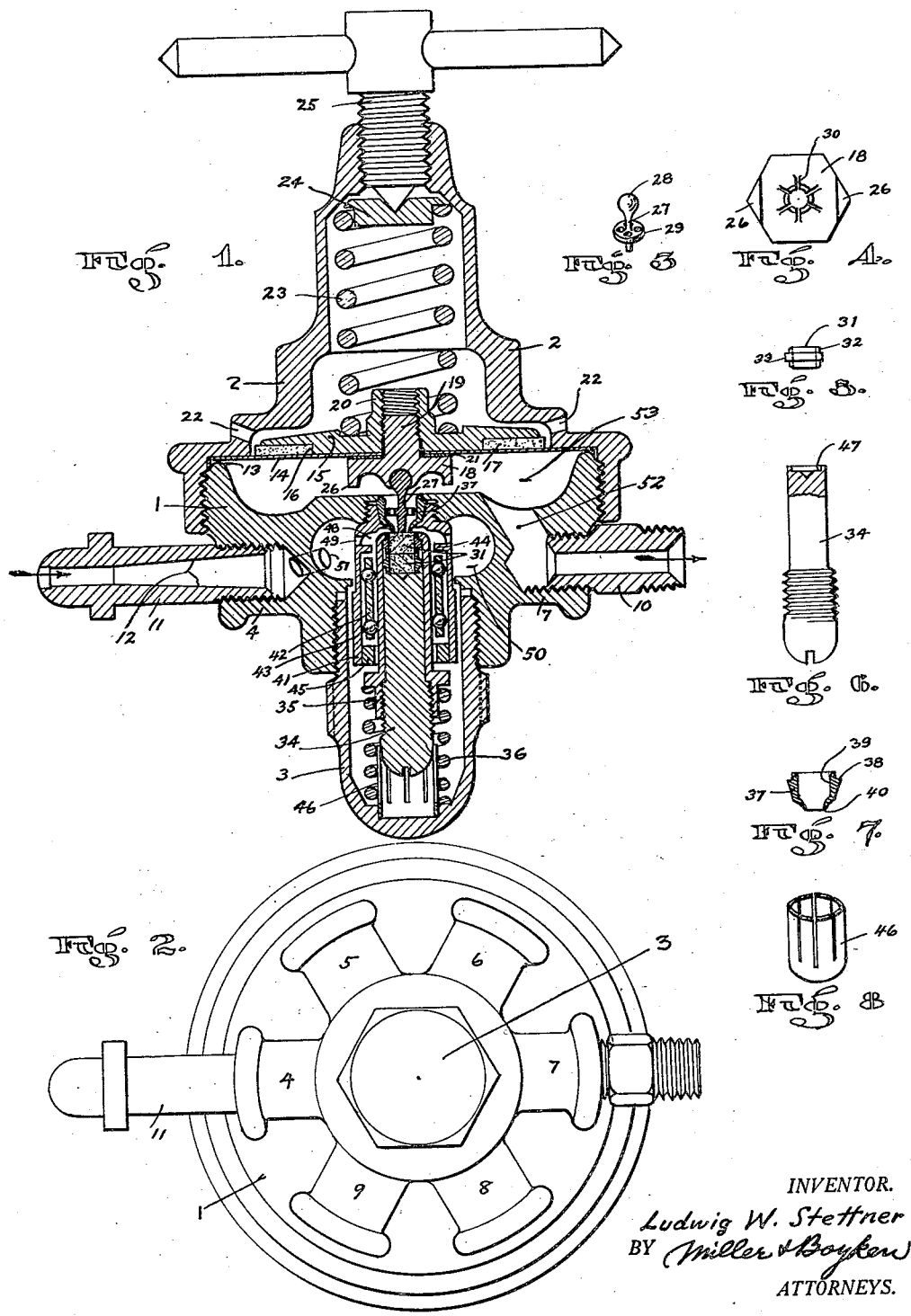

1,739,926

UNITED STATES PATENT OFFICE

LUDWIG W. STETTNER, OF OAKLAND, CALIFORNIA, ASSIGNOR, BY MESNE ASSIGNMENTS, TO VICTOR WELDING EQUIPMENT CO., A CORPORATION OF DELAWARE

FLUID-PRESSURE REGULATOR

Application filed August 27, 1927. Serial No. 215,930.

This invention relates to automatic pressure regulating valves for fluids generally, but particularly as used for reducing the pressure of high pressure gases to suitable working pressures as required for industrial use.

The objects of the invention are to provide a valve mechanism of this character which is easy to manufacture, assemble and adjust, and which will be very sensitive and maintain the pressure for which it is set with negligible variations during a considerable variation in amount of gas drawn off and which will overcome the tendency of such valves to freeze during operation in reducing the pressure of high pressure gases. Other objects will appear in the following description.

Briefly described my invention comprises novel construction in a pressure reducing and regulating valve of the diaphragm type in which the movements of the valve members proper for allowing escape of gas from the high pressure side to the low pressure side of the regulator are controlled by opposed springs influenced by the gas pressure upon the diaphragm.

In the drawings accompanying this specification, Fig. 1 is a vertical sectional view of the complete regulator showing all internal mechanism, and Fig. 2 is a bottom view of the regulator.

Fig. 3 is a perspective view of the diaphragm pin or valve stem; Fig. 4 is a bottom view of the diaphragm nut to which the valve stem or pin swively attaches; Fig. 5 is a side elevation of the valve seat; Fig. 6 a side elevation of the valve seat support; Fig. 7 a vertical section of the valve nozzle which closes against the seat, and Fig. 8 a perspective view of the split bushing for the lower end of the seat support.

In further detail my regulator comprises a round body 1 preferably of pressed bronze chambered and provided with several gas passages and surmounted by a bonnet 2 screwed thereto closing the upper end, and a hollow cap 3 screwed to and closing the lower end of the body.

Spaced around the body are a plurality of threaded pipe connections 4, 5, 6, 7, 8 and 9 adapted variously to form inlets, outlets, gage connections, et cetera, all depending on how they are drilled through to meet various chambers within the body, in Fig. 1 connection 4 being the high pressure inlet, and connection 7 the low pressure outlet, though there may be more than one inlet and outlet if desired.

To the outlet 7 is screwed a nipple 10 and to the inlet 4 a nipple 11, the latter provided with an internal bore 12 tapering larger in a direction toward the regulator so as to provide an expansion chamber for the incoming gas.

The upper annular edge of the body is rounded as at 13 and overhanging which edge is a downwardly flanged diaphragm 14 secured tightly in place by the bonnet being screwed against its upper peripheral margin.

This diaphragm is centrally apertured and has a round plate 15 centrally positioned on top, the plate provided with a central boss 16 bearing against the diaphragm and formed with an outer annular recess in which is seated a resilient washer 17 preferably made of sponge rubber, while at the under side of the diaphragm is a hub or nut 18 provided with a threaded extension 19 passing through the aperture in the diaphragm and screwing into a threaded hole in a boss 20 formed on the plate 15 so as to clamp the diaphragm tightly in the center. A thin gasket washer 21 is preferably interposed between the diaphragm and nut 18 to form a tight joint and the exterior of nuts 18 and boss 20 are preferably made hexagon for gripping with a wrench.

When tightened in place as shown the plate 15 compresses the sponge rubber washer 17 against the upper side of the diaphragm to a fraction of its original thickness but still permits of further compression as the rubber is in a recess, the object of the construction being to permit flexing of the diaphragm while resiliently sustaining it over almost its entire upper surface against the gas pressure against its under side, the sponge rubber expanding or contracting to any required extent to meet any deformation of the diaphragm.

The bonnet is vented at 22 and houses a stiff coiled spring 23 bearing at its lower end against the plate 15 and its upper end against a floating washer 24 which may be forced downwardly to any required degree by means of the adjusting screw 25 threaded through the bonnet, so that any desired pressure may be conveyed to the diaphragm through the intermediary of the spring 23.

The nut 18 has a pair of stop lugs 26 formed thereon and depending from its center is a valve stem 27.

This valve stem 27 is preferably made of stainless steel and is best shown in Fig. 3 where it will be seen to have a ball 28 formed on its upper end and a perforated disk 29 at an intermediate position.

The nut 18 is recessed with a hemispherical socket to receive the ball 28 of the valve stem, and surrounding the recess is a circular lip radially slotted as at 30 so that the prongs thereby formed may be compressed to retain the ball in place or the ball may forcibly be pulled out, thus providing a ball and socket swivel connection of the valve stem to the diaphragm which permits of the ball being removed for insertion of a replacement valve stem.

Axially aligned below the valve stem is a valve seat 31 preferably a hard rubber button surrounded by a metal ferrule 32 provided with a shoulder flange 33 (see Fig. 5) supported for vertical movement upon a supporting rod 34 screwed into a sleeve 35 in turn resting upon a spiral spring 36 which forces the sleeve and thereby the rod 34 and valve seat upward in opposition to the downward pressure of the stem 27 and to press the seat against the annular edge of a downwardly directed valve nozzle 37. The form of this nozzle is best shown in Fig. 7 where it will be seen to be an outwardly tapered ferrule shouldered at 38, with a straight internal bore 39 adapted to slidably receive the valve stem disk 29 and reduced at the lower end and formed into a downwardly extending valve rim 40 which seats upon the valve seat 31 when the low pressure side of the regulator has reached the point for which the regulator is set.

This nozzle is preferably made of stainless steel and when in place shoulders against the body and is forced into proper position and centrallized by means of a tubular housing 41 inwardly tapered at its upper end to match the taper of the nozzle and screwed into the body as indicated.

The housing extends downwardly into the hollow cap 3 and is preferably of hexagonal or octagonal exterior so that upon removing the cap, the housing may also be unscrewed to thereby release the nozzle for downward removal from the body for replacement or interchange for other size nozzles for any particular service requirement.

The housing is preferably of hard metal such as hard stainless steel, as also is the sleeve 35 and these members are of respectively internal and external diameters to provide a space in which is nicely fitted an annular ball bearing comprising a tubular retainer 42 carrying several annular rows of hardened stainless steel balls as at 43, the arrangement being such that the ball races travel vertically during vertical oscillation of the valve seat rod 34 and its sleeve 35 in the operation of the regulator.

The housing 41 is provided with internal shoulders 44, 45 above and below the ball bearing holding it in place but spaced to permit the required vertical movement of the bearing, the lower shoulder 45 is preferably pressed in so that it may be forced out if necessary to replace the bearing.

The lower end of the valve seat supporting rod 34 is snugly embraced by a tubular split or castellated spring thimble 46 resting on the lower inner end of the cap 3. This thimble 46 is best shown in Fig. 8, it is embraced by the spring 36 when in position and permits sliding of the rod 34 in its yielding grip.

By reference to Fig. 1 it will be observed that there are two complete valve seats 31, one beneath the one in contact with the nozzle 37. The lower one is an extra one carried in a socket 47 in the rod 34 so that a reserve seat is always at hand for interchange with a worn one when required, it being noted that the valve seats are symmetrical so that they may also be reversed end for end to provide two wearing faces for each seat, the annular shoulder 33 on the valve flange being central so that either working face will be in proper position when the shoulder is seated against the internal shoulder shown at the upper end of the sleeve 35.

The housing 41 is internally formed to provide an annular chamber 48 just below the valve nozzle 37 and a row of perforations 49 connect this chamber with a larger annular chamber 50 formed in the body 1 which in turn is open to the inlet nipple 4 through means of a pair of ports 51 (one only being shown) diverging from the bore of the nipple 4 to meet the chamber 58 tangentially.

Opposite the inlet ports 51 an upwardly extending port 52 opens the outlet nipple 7 to a large chamber 53 beneath the diaphragm.

The other nipples 5, 6, 8 and 9 are variously drilled to connect with chamber 50 for other high pressure inlets and/or a high pressure gage, or to connect with chamber 53 for additional outlets and/or a low pressure gage.

In operation of my regulator the high pressure fluid or gas at say several thousand pounds pressure enters the inlet controlled by a common service valve not shown and encounters a constantly widening port 12 which splits into two diverging ports 51 leading to the annular chamber 50 surrounding the upper end of the valve housing 41.

If the valve is open by reason of a superior pressure being put upon the upper side of the diaphragm by means of the adjusting screw 25 the gas will further expand through the perforations in the valve stem disk 29 into the sub-diaphragm space 53 until the desired low pressure is built up and at which time the valve will close and through constant oscillation will maintain the pressure for which it is set regardless of the fluctuating use of the gas through the low pressure outlet.

The superior operation of my regulator is due to several features including the expansion inlet, the splitting of the incoming stream so as to avoid gas impingement on a local area at a point of expansion to thereby freeze the valve, the free operation of the valve seat through employment of the vertically or moving ball bearing working axially between two hardened cylindrical surfaces, the special shape of the nozzle, universal suspension of the valve stem, sponge rubber yielding support of the diaphragm, the comparatively thin metal of the body walls for transmission of atmospheric heat to the interior, and use of stainless steel for the parts mentioned.

To the above features must be added the practical advantages afforded by the reversibility of the valve seats, the magazine feature of extra seats, removable nozzle for insertion of other sizes or replacements, removable universally suspended valve stem, as well as the other features described.

I claim:

1. In a fluid pressure regulator structure, a chambered body having high and low pressure passages, diaphragm controlled valve means within the body for controlling the pressure from the high to the low pressure passage, the high pressure passage including an annular chamber around said valve means and an inlet port entering the wall of said chamber tangentially.

2. In a fluid pressure regulator structure, a chambered body having high and low pressure passages, diaphragm controlled valve means within the body for controlling the pressure from the high to the low pressure passage, the high pressure passage including an annular chamber around said valve means and a "bifurcated" inlet port with its terminals entering the wall of said chamber tangentially.

3. In a fluid pressure regulator structure, a chambered body having high and low pressure connections extending thereto, diaphragm controlled valve means within the body for controlling the pressure from the high to the low pressure connection, a rigid plate positioned against one side of the diaphragm with a balancing spring pressing against said plate, and a ring of resilient rubber compressed between the margin of the plate and the diaphragm arranged to reinforce the latter and adapted to yield to flexing of the diaphragm.

4. In a fluid pressure regulator structure of the diaphragm valve controlled type, a valve mounted on a rod for axial movement therewith, and an annular ball bearing surrounding said rod arranged for axial movement while radially supporting the rod, and yielding means laterally steadying the end of said rod remote from said ball bearing.

LUDWIG W. STETTNER.